Patented Mar. 9, 1954

2,671,740

UNITED STATES PATENT OFFICE 2,671,740

IMPREGNATING CELLULOSE TEXTILE FIBERS

Thomas C. Whitner, Elizabeth, N. J.

No Drawing. Application April 16, 1951,
Serial No. 221,323

13 Claims. (Cl. 117—143)

This invention relates to impregnation of cellulose fibers and particularly to the impregnation of cellulose textile fibers with sericeous material. In U. S. Patent 2,417,388, I have described a method whereby impregnation of such textile fibers with sericeous material can be accomplished with the aid of an aqueous solution containing both an alkylolamine-copper complex and a small proportion of an alkali metal hydroxide. Silk fibers are dissolved in such a solution, cellulose fibers then are impregnated with the solution of silk, and afterwards the impregnated fibers are washed with an aqueous solution of an acidic agent forming water-soluble salts with the copper complex and with the alkali metal hydroxide and lastly with water to remove the water-soluble salts. Such aqueous solutions of an alkali metal hydroxide and an alkylolamine-copper complex are solvents for silk but apparently exert very little if any solvent effect on cellulose.

I have observed that tetra-alkylol ammonium hydroxides, such as tetra-ethanol, tetra-propanol and tetra-butanol ammonium hydroxides, can be substituted for alkylolamines in the preparation of aqueous solutions which are solvents for silk. Such alkylol substituted ammonium hydroxides form water-soluble complexes with copper. In my co-pending application Ser. No. 748,674 now U. S. Patent No. 2,646,372, I have disclosed that when both free or uncombined tetra-alkylol ammonium hydroxide and a copper complex are present simultaneously in an aqueous solution the latter becomes a solvent for silk fibers. In this respect the tetra-substituted ammonium hydroxides differ from alkylol substituted ammonia (or alkylolamines). That is, an aqueous solution of free or uncombined alkylolamine and a copper complex thereof does not seem to be a solvent for silk.

In addition, I have observed that saturation of an aqueous solution of a tetra-alkylol ammonium hydroxide with cupric hydroxide furnishes an aqueous solution which is a solvent for silk and which can be employed for impregnating cellulose fibers with sericeous material. In this respect, too, aqueous solutions of a tetra-alkylol ammonium hydroxide differ from those of an alkylolamine. That is, an aqueous solution of only an alkylolamine when saturated with cupric hydroxide is not a solvent for silk and cannot be used for impregnation of cellulose fibers with sericeous material.

Solutions suitable for impregnating cellulose fibers with sericeous material according to this invention can be prepared in any convenient manner. For example, a water-soluble copper salt, such as copper chloride, sulfate or acetate, is dissolved in the aqueous medium and an aqueous solution of the tetra-alkylol ammonium hydroxide added thereto slowly. At first, insoluble copper hydroxide (or hydrated copper oxide) is formed but as more of the tetra-alkylol ammonium hydroxide is added slowly this insoluble copper compound dissolves giving rise to a blue colored aqueous solution. The depth of color of the latter will depend, of course, on the proportion and quantity of copper salt initially employed. Care should be exercised in adding the tetra-alkylol ammonium hydroxide to the solution of copper salt in that no appreciable or substantial excess of the substituted ammonium compound is used. It is a purpose of this invention to prepare aqueous solutions of tetra-alkylol ammonium hydroxide-copper complexes which contain no substantial excess of the substituted ammonium hydroxide over that amount needed to react with the copper compound.

Another procedure for preparing solutions suitable for my purpose comprises dissolving the copper salt in water, adding an alkali (e. g., sodium or potassium hydroxide) to this solution to precipitate copper hydroxide, washing the latter with water until it is substantially free of alkali and salts, admixing the washed copper hydroxide with water, and admixing a solution of the tetra-alkylol ammonium hydroxide with the water and copper hydroxide until the latter dissolves with the simultaneous formation of a blue aqueous solution. As mentioned above, any appreciable excess of the tetra-alkylol ammonium hydroxide should be avoided.

Still another method comprises adding cupric hydroxide to an aqueous solution of the tetra-alkylol ammonium hydroxide until the aqueous solution has become saturated with the copper compound and an excess of the latter is in contact with the aqueous liquid. Excess cupric hydroxide can be separated from the solution by filtration or by decantation or in any other appropriate or convenient manner.

After the aqueous solution of copper complex has been prepared by any one of the above-indicated procedures, or by an equivalent procedure, silk fibers are admixed therewith and the mixture stirred until the fibers dissolve or until the solution becomes saturated with silk. Preferably, this dissolution of silk is effected at room or atmospheric temperature. The actual quantity of silk which can be dissolved in a solution of the copper complex depends upon the concentration of it and by varying the concentration of the complex it is possible to obtain solutions having widely varying quantities of silk dissolved therein.

The silk fibers used for impregnating cellulose according to my invention preferably are subjected to a degumming operation prior to their employment. If desired, they may be bleached also before being dissolved in the aqueous solution of copper complex. Silk fibers which are not weighted (e. g., impregnated with oxides or salts of metals) are particularly suitable. However, I do not wish to preclude employment of weighted fibers.

Impregnation of cellulose fibers with the aqueous solutions containing dissolved silk can be effected in any convenient or appropriate manner. For example, the cellulose fibers may be immersed in the solution of silk until they are saturated with it. Or, the solution of silk may be sprayed onto the cellulose fibers. The exact manner in which impregnation is accomplished is not so important. The important point is to obtain complete and thorough saturation of the cellulose fibers with the solution of silk.

After the fibers are impregnated, they are washed with an aqueous solution of an acidic substance. The latter may be an acid, such as hydrochloric, hydrobromic, sulfuric or acetic acid, or may be an acidic salt, such as sodium or potassium bisulfate. The acidic agent employed in this step should form water-soluble salts with the tetra-alkylol ammonium hydroxide and with copper. The concentration of the aqueous solution of acidic agent should be great enough to effect substantially complete removal of all copper compounds from the cellulose fibers as well as that of all the alkaline substance employed, but not sufficiently great to effect any harmful or deleterious action on the textile fibers undergoing treatment.

After the acid wash, the cellulose fibers are washed or rinsed with water to obtain substantially complete removal of water-soluble salts as well as of acidic agent retained by the fibers. Next, the latter can be dried in any convenient manner.

The following examples will illustrate my invention.

*Example 1.*—To a portion of an aqueous solution containing substantially 20 per cent of tetra-ethanol ammonium hydroxide was added cupric hydroxide, in small portions and with stirring, until the liquid appeared to be saturated with the copper compound. Considerable excess of cupric hydroxide then was admixed with the aqueous liquid and the mixture allowed to stand at room temperature, with occasional stirring, for 3 days. Afterwards, the aqueous liquid was filtered from undissolved material.

To the dark blue-colored filtrate was added silk fibers in the proportion of 0.5 g. of fibers to 20 cc. of liquid. The mixture was permitted to stand for 2 hours at room temperature and during this time it was stirred occasionally. Most of the silk dissolved and the liquid changed in color from blue to purple. Undissolved silk was removed by filtration. A substantial portion of the filtered liquid was acidified with dilute aqueous sulfuric acid. A heavy precipitate of regenerated silk was obtained.

*Example 2.*—The procedure as given in Example 1 was repeated but substituting triethanolamine for tetra-ethanol ammonium hydroxide.

In this instance also, cupric hydroxide dissolved and furnished a dark blue-colored liquid. When silk fibers were treated with this blue liquid there was no discernible change in the color of the liquid.

When the liquid was separated from undissolved fibers and was tested (by acidification) for dissolved silk, a negative result was obtained.

*Example 3.*—Aqueous tetra-ethanol ammonium hydroxide (40 per cent) was diluted with three times its volume of water. The resulting aqueous alkaline solution was saturated with cupric hydroxide by admixing the latter compound with the liquid and shaking the mixture until no more of the solid appeared to dissolve. A considerable excess of copper hydroxide then was admixed with the liquid and the mixture allowed to stand overnight at room temperature. Next, the blue aqueous liquid was separated from undissolved copper compound.

This aqueous solution was saturated with silk by admixing bleached silk cloth (cut into small pieces) and stirring the mixture. When the solution appeared to be saturated with dissolved silk, more of the latter was added and the mixture allowed to stand overnight at room temperature. Undissolved silk then was separated by filtration.

Unbleached cotton cloth was saturated with some of the filtered solution of silk, and when saturated the cloth was permitted to drain and to dry while exposed to the atmosphere. The dried cloth was washed with dilute sulfuric acid, then with water and afterwards dried. It possessed a distinctly smoother feel than the untreated fabric.

A portion of this treated fabric and also one of the untreated cloth were dyed separately. In each instance, the dye bath consisted of 100 parts of water per 1 part of cloth and 8 per cent (on weight of the sample) of a red acid dye (Fast Red SS Extra) dissolved therein. The samples were immersed in the respective baths for 3 hours at room temperature. Afterwards, the fabrics were removed, rinsed well with cold water and dried. The untreated sample was a light red in color, while the treated cloth was a good full red in color.

*Example 4.*—To a solution consisting of 2 g. of copper chloride ($ClCl_2 \cdot 2H_2O$) in 25 cc. of water was added 20 per cent aqueous tetraethanol ammonium hydroxide slowly and with stirring until all of the initially-precipitated cupric hydroxide was dissolved. Then to the aqueous solution was added a small portion of copper chloride so that a persistent cloud or turbidity was obtained. This last step merely prevented any appreciable excess of the alkaline agent being present over that quantity required to dissolve the precipitated cupric hydroxide. The aqueous liquid then was diluted with water to a volume of 100 cc.

Silk fibers were admixed with this solution until a considerable excess of undissolved fibers was present. The mixture was allowed to stand overnight at room temperature and then the undissolved material was separated by filtration.

Bleached cotton cloth was saturated with some of the clear filtered liquid and then was permitted to drain but not to dry. Afterwards, the wet cloth was admixed with approximately three times its weight of aqueous 10 per cent sulfuric acid, and allowed to remain in contact (in a closed container) with the aqueous acid overnight. Next, the fabric was drained of the acidic liquid and rinsed well with cold water. Then it was dried by exposure to the atmosphere. Increase in weight of this sample indicated it contained 1.4 per cent of impregnating sericeous material.

This treated sample and also one of the original fabric were dyed separately. In this instance, each dye bath consisted of 100 parts of water per 1 part of cloth and 10 per cent (on weight of the sample) of soluble Eosin (sodium salt of tetrabromofluorescein) dissolved therein. The fabrics were immersed in the respective baths for 3.5 hours at room temperature. Afterwards, they were removed from the baths, rinsed well with cold water, and dried. The untreated cloth dyed to a light pink color. The impregnated fabric was much darker in color and was actually a red.

From the foregoing disclosures it will be seen that my invention involves preparing a solution of silk fibers by dissolving the latter in an aqueous solution which contains substantially only a tetra-alkylol ammonium hydroxide as the alkaline agent and which is saturated with cupric hydroxide. My invention also includes impregnating cellulose fibers, such as cotton or linen, with the silk solution and afterwards washing the impregnated fibers with an aqueous solution of an acidic agent which will convert the copper compound as well as the tetra-alkylol ammonium hydroxide into water-soluble salts. Although a large proportion of these salts will be removed from the fibers during the acid wash, nevertheless I rinse or wash well the fibers afterwards with water so that substantially all water-soluble salts and all of the acidic agent are eliminated from the cellulose fibers. As an alternative procedure, the cellulose fibers after impregnation with the silk solution may be dried at substantially room or atmospheric temperature and then washed with an aqueous acidic agent and with water.

Aqueous solutions of substantially only alkylolamines are solvents for cupric hydroxide but the resulting solutions of such alkylolamine-copper complexes are not solvents for silk, as mentioned earlier in this application. Aqueous solutions of substantially only a tetra-alkyl ammonium hydroxide (e. g., tetra-ethyl or tetramethyl ammonium hydroxide) exert a very limited or inappreciable solvent action on cupric hydroxide, and therefore are not suitable for my present purpose. On the other hand, aqueous solutions of substantially only tetra-alkylol ammonium hydroxides dissolve appreciable quantities of cupric hydroxide and moreover the resulting solutions of such copper complexes are solvents for silk.

As pointed out previously, the acidic agent employed in the acid wash should be one that will furnish water-soluble interaction products with the tetra-alkylol ammonium hydroxide and with cupric hydroxide. The acidic agent can be an inorganic compound, such as hydrochloric or sulfuric acid, or it can be an organic or carboxylic compound, e. g., acetic or lactic acid. The strength of the solution of this agent may be varied over a wide range and concentrations of 5, 10, 15 or even 20 per cent may be employed. The exact concentration and also the quantity of solution will be governed largely by such factors as the amount of fibers being treated and the proportion of copper complex impregnated in the fibers. It is important, however, that the quantity and the concentration of the acidic solution be great enough so that during the washing operation the liquid will not become locally neutral or alkaline.

Cellulose fibers such as cotton or linen are suitable for my purpose and these fibers should be substantially free of extraneous materials such as size, resin, gum and the like before being impregnated with the silk solution. It will be understood that in the above examples illustrating my invention all cellulose material was given an appropriate treatment, such as an alkali boil, prior to impregnation. Moreover, the fibers prior to impregnation may be bleached, unbleached, bleached and mercerized, or unbleached and mercerized. Also, the fibers may be treated with the silk solution when they are in the form of loose fibers, yarns or woven fabrics.

Although I have illustrated my invention by one treatment (impregnation, washing and drying) of cellulose fibers I do not wish to be limited to this condition. If desired, the fibers can be given two or more successive treatments and thereby build up or increase the proportion of sericeous material impregnated in them.

What I claim is:

1. The process for treating cellulose fibers which comprises impregnating said fibers with an aqueous solution of a tetra-alkylol ammonium hydroxide saturated with cupric hydroxide and containing dissolved silk, said tetra-alkylol ammonium hydroxide being the only alkaline agent, washing said impregnated fibers with an aqueous solution of an acidic agent yielding water-soluble salts with said tetra-alkylol ammonium hydroxide and with cupric hydroxide, and removing substantially all of said water-soluble salts and said acidic agent from said cellulose fibers.

2. The process for treating cellulose fibers which comprises impregnating said fibers with an aqueous solution of a tetra-alkylol ammonium hydroxide saturated with cupric hydroxide and containing dissolved silk, said tetra-alkylol ammonuim hydroxide being the only alkaline agent, drying said impregnated fibers at substantially atmospheric temperature, washing said impregnated and dried fibers with an aqueous solution of an acidic agent yielding water-soluble salts with said tetra-alkylol ammonium hydroxide and with cupric hydroxide, and removing substantially all of said water-soluble salts and said acidic agent from said cellulose fibers.

3. The process according to claim 2 in which the tetra-alkylol ammonium hydroxide is tetra-ethanol ammonium hydroxide.

4. A bath for impregnating cellulose fibers which comprises an aqueous solution of a tetra-alkylol ammonium hydroxide saturated with cupric hydroxide and silk dissolved therein, said tetra-alkylol ammonium hydroxide being the only alkaline agent.

5. A bath according to claim 4 in which the tetra-alkylol ammonium hydroxide is tetra-ethanol ammonium hydroxide.

6. The process which comprises saturating an aqueous solution of a tetra-alkylol ammonium hydroxide with cupric hydroxide and then dissolving silk in said aqueous solution, said tetra-alkylol ammonium hydroxide being the only alkaline agent.

7. The process according to claim 6 in which the tetra-alkylol ammonium hydroxide is tetra-ethanol ammonium hydroxide.

8. The process which comprises adding only a tetra-alkylol ammonium hydroxide to an aqueous solution of a water-soluble cupric salt until substantially all cupric hydroxide dissolves in the aqueous solution, and a solution of a tetraalkylol ammonium hydroxide saturated with cupric hydroxide is obtained, and then dissolving silk in said aqueous solution.

9. The process according to claim 8 in which the tetra-alkylol ammonium hydroxide is tetra-ethanol ammonium hydroxide.

10. The process for treating cellulose fibers according to claim 1 in which the tetra-alkylol ammonium hydroxide is tetra-ethanol ammonium hydroxide and the fibers after impregnation and before washing with the aqueous acidic agent, are dried at substantially atmospheric temperature.

11. The process for treating cellulose fibers according to claim 3 in which the fibers after impregnation and before washing with the aqueous acidic agent, are dried at substantially atmospheric temperature.

12. The method according to claim 1 in which the alkyl group is from 2 to 4 carbon atoms.

13. The method according to claim 3 in which the alkyl group is from 2 to 4 carbon atoms.

THOMAS C. WHITNER.

References Cited in the file of this patent

UNITED STATES PATENTS

| Number | Name | Date |
|---|---|---|
| 2,145,855 | Bley | Feb. 7, 1939 |
| 2,417,388 | Whitner | Mar. 11, 1947 |